(12) United States Patent
Murakami et al.

(10) Patent No.: US 7,923,647 B2
(45) Date of Patent: Apr. 12, 2011

(54) PORTABLE DEVICE

(75) Inventors: Takeshi Murakami, Aichi (JP);
Hiroyuki Sugiyama, Aichi (JP); Yutaka Yoshida, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 1056 days.

(21) Appl. No.: 11/689,049

(22) Filed: Mar. 21, 2007

(65) Prior Publication Data

US 2007/0223152 A1    Sep. 27, 2007

(30) Foreign Application Priority Data

Mar. 22, 2006  (JP) .................................. 2006-078329

(51) Int. Cl.
*H01L 23/02*  (2006.01)
(52) U.S. Cl. ........................................ 174/564; 174/560
(58) Field of Classification Search .................. 174/520, 174/559, 564, 560
See application file for complete search history.

(56) References Cited

U.S. PATENT DOCUMENTS

| | | | | |
|---|---|---|---|---|
| 4,560,083 A * | 12/1985 | Danico | ........................ | 220/786 |
| 5,550,324 A * | 8/1996 | Black et al. | ................... | 174/564 |
| 5,621,311 A * | 4/1997 | Kamiya | ........................ | 324/156 |
| 6,016,676 A * | 1/2000 | McConnell | ..................... | 70/408 |
| 6,222,122 B1 * | 4/2001 | Davidson | ....................... | 174/554 |
| 6,621,446 B1 * | 9/2003 | Chaillie | ........................ | 341/176 |
| 6,852,929 B2 * | 2/2005 | Scudder | .......................... | 174/66 |
| 2004/0099430 A1 * | 5/2004 | Scudder | ....................... | 174/52.3 |
| 2004/0201512 A1 | 10/2004 | Sugimoto et al. | | |

FOREIGN PATENT DOCUMENTS

| | | |
|---|---|---|
| DE | 42 26 579 A1 | 2/1994 |
| EP | 1 327 734 A1 | 7/2003 |
| EP | 1 445 738 A1 | 8/2004 |
| JP | 2003-320585 | 11/2003 |
| JP | 2005-014401 | 1/2005 |
| JP | 2005-235837 | 9/2005 |

* cited by examiner

*Primary Examiner* — Hung V Ngo
(74) *Attorney, Agent, or Firm* — Patterson Thuente Christensen Pedersen, P.A.

(57) ABSTRACT

A portable device enabling a user to visually recognize tampering with internal components. The portable device is for performing wireless communication with a predetermined communication subject and includes a circuit board on which an electronic component is mounted and a case for accommodating the circuit board. The case includes a first case part including a board compartment for accommodating the circuit board and a second case part for covering the circuit board accommodated in the board compartment of the first case part. The first case part and the second case part are joined with each other and unitized in a superimposed state.

11 Claims, 7 Drawing Sheets

PORTABLE DEVICE

BACKGROUND OF THE INVENTION

The present invention relates to a portable device for performing wireless communication with a predetermined communication subject.

Vehicles, such as automobiles, nowadays often incorporate electronic key systems to improve vehicle operation convenience. Such an electronic key system locks and unlocks doors and enables the starting of the engine when a unique ID code transmitted from a portable device, which is carried by a user, is identical to an ID code registered in the vehicle. The portable device has a case for accommodating a circuit board on which various electronic components are mounted and a battery for supplying power to the electronic components on the circuit board.

Japanese Laid-Open Patent Publication No. 2005-235837 describes an example of a case for a portable device. The case of the portable device is formed by a first case part and a second case part, which are fastened to each other. More specifically, the first case part has an open end. A plurality of projections are formed at predetermined intervals along the rim of the first case part at the open end. The second case part also has an open end. A plurality of recesses are formed in the rim of the second case part at the open end in correspondence with the projections of the first case part. The projections are engaged with the recesses to fasten the first and second case parts to each other.

The first case part and the second case part are fastened to each other only by the engagement between the projections and the recesses. Thus, a person other than the user may be able to disassemble the case of the portable device in a relatively simple manner. Such a person may disassemble the case by disengaging the projections of the first case part from the recesses of the second case part in order to remove the circuit board from the case. If the first and second case parts are fastened again to each other after the circuit board is removed, the user would not be aware for a while of tampering with the circuit board.

SUMMARY OF THE INVENTION

The present invention provides a case and portable device enabling tampering of the circuit board to be visually recognizable.

One aspect of the present invention is a portable device for performing wireless communication with a predetermined communication subject. The portable device includes a circuit board on which an electronic component used to perform wireless communication is mounted and a case for accommodating the circuit board. The case includes a first case part having a board compartment for accommodating the circuit board. A second case part covers the circuit board when accommodated in the board compartment of the first case part. The first case part and the second case part are joined with each other and unitized in a superimposed state.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A portable device 11, which performs wireless communication with a predetermined communication subject, according to a preferred embodiment of the present invention will now be discussed. The portable device is used in an electronic key system together with a lock controller, which is installed in a vehicle. When a user, who is carrying the portable device 11, enters within a predetermined range set for the vehicle, the portable device 11 receives a request signal transmitted from the lock controller. In response, the portable device 11 transmits an ID signal, which contains an ID code of the portable device 11. The lock controller receives the ID signal from the portable device 11 and compares the ID code contained in the ID signal with an ID code of the vehicle that is stored in the lock controller. When the ID codes are identical, the lock controller unlocks the vehicle doors.

Figure 1A:
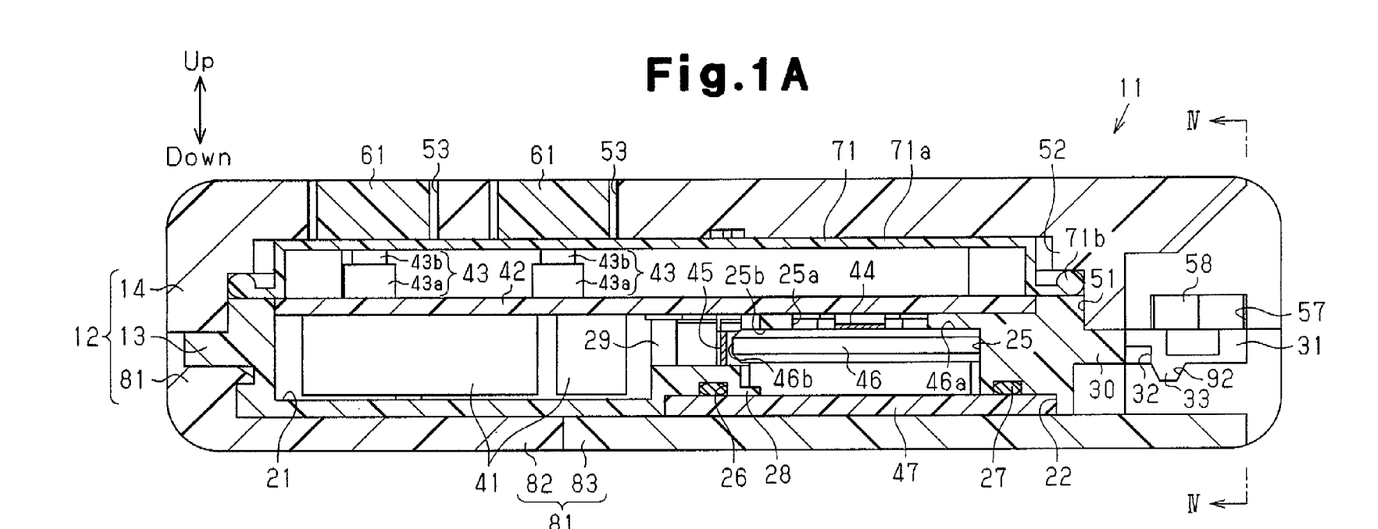
FIG. 1A is a cross-sectional view of a portable device according to a preferred embodiment of the present invention.
Figure 1B:
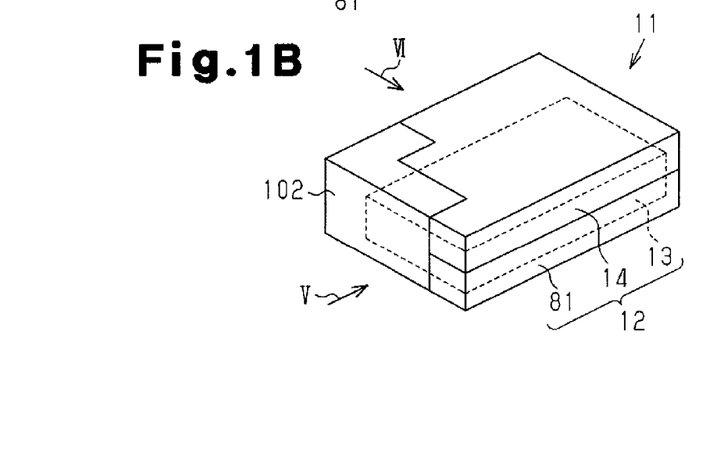
FIG. 1B is a schematic perspective view showing the portable device.

Referring to FIG. 1A, the portable device 11 includes a case 12, which is formed by a first case part 13, a second case part 14, and a cover 81. As viewed in FIG. 1A, the first case part 13 has an upper portion, which is open, and a lower portion. The second case part 14 has a lower portion, which is open and fixed to the first case part 13 so as to cover the open upper portion of the first case part 13. The cover 81 covers the lower portion of the first case part 13. When assembled together, the first case part 13, the second case part 14, and the cover 81 form a box as shown in FIG. 1B. Hereafter, the upper direction and lower direction of the portable device 11 will be based on the view in FIG. 1B throughout the drawings.

Figure 2:
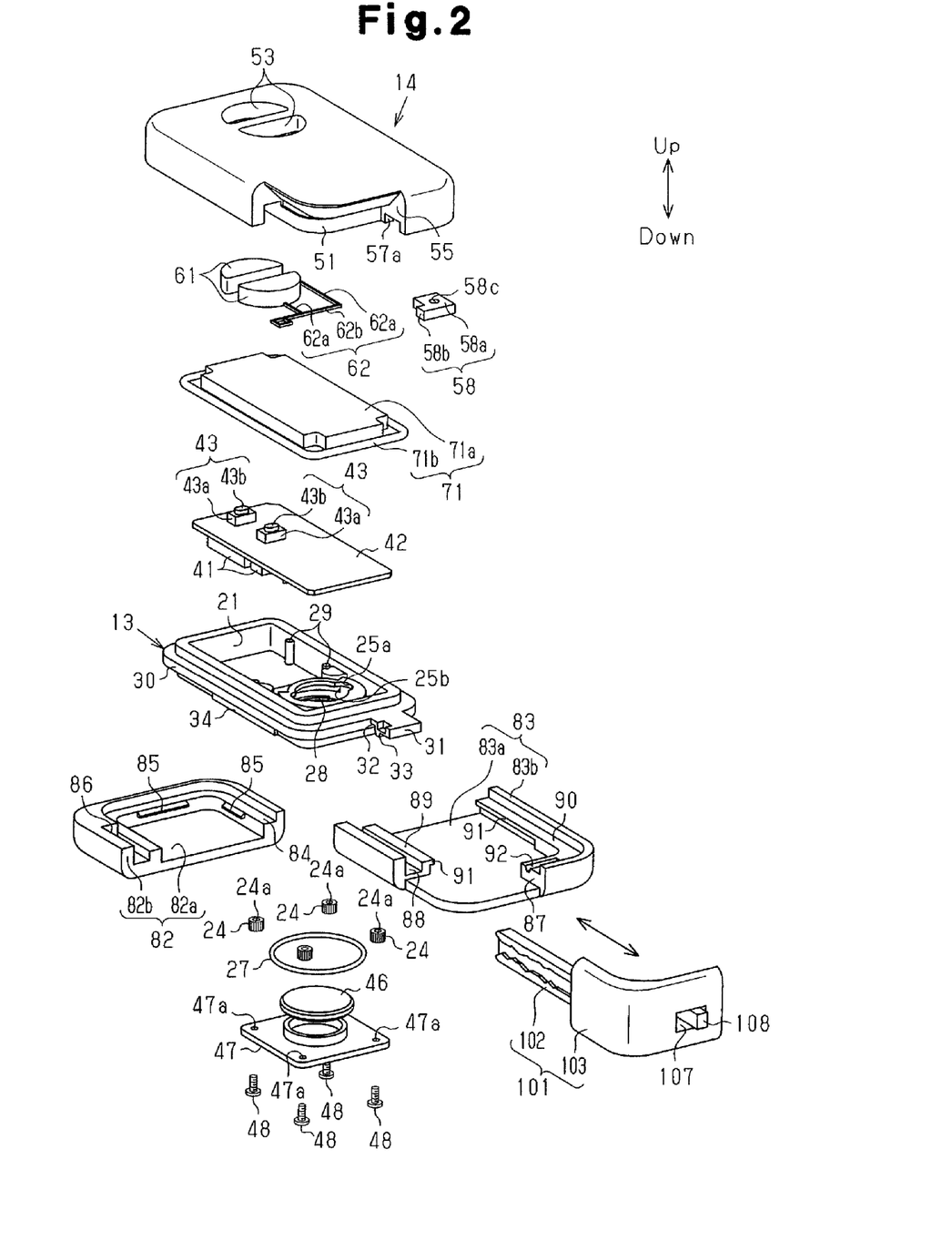
FIG. 2 is an exploded perspective view showing the portable device.
Figure 3:
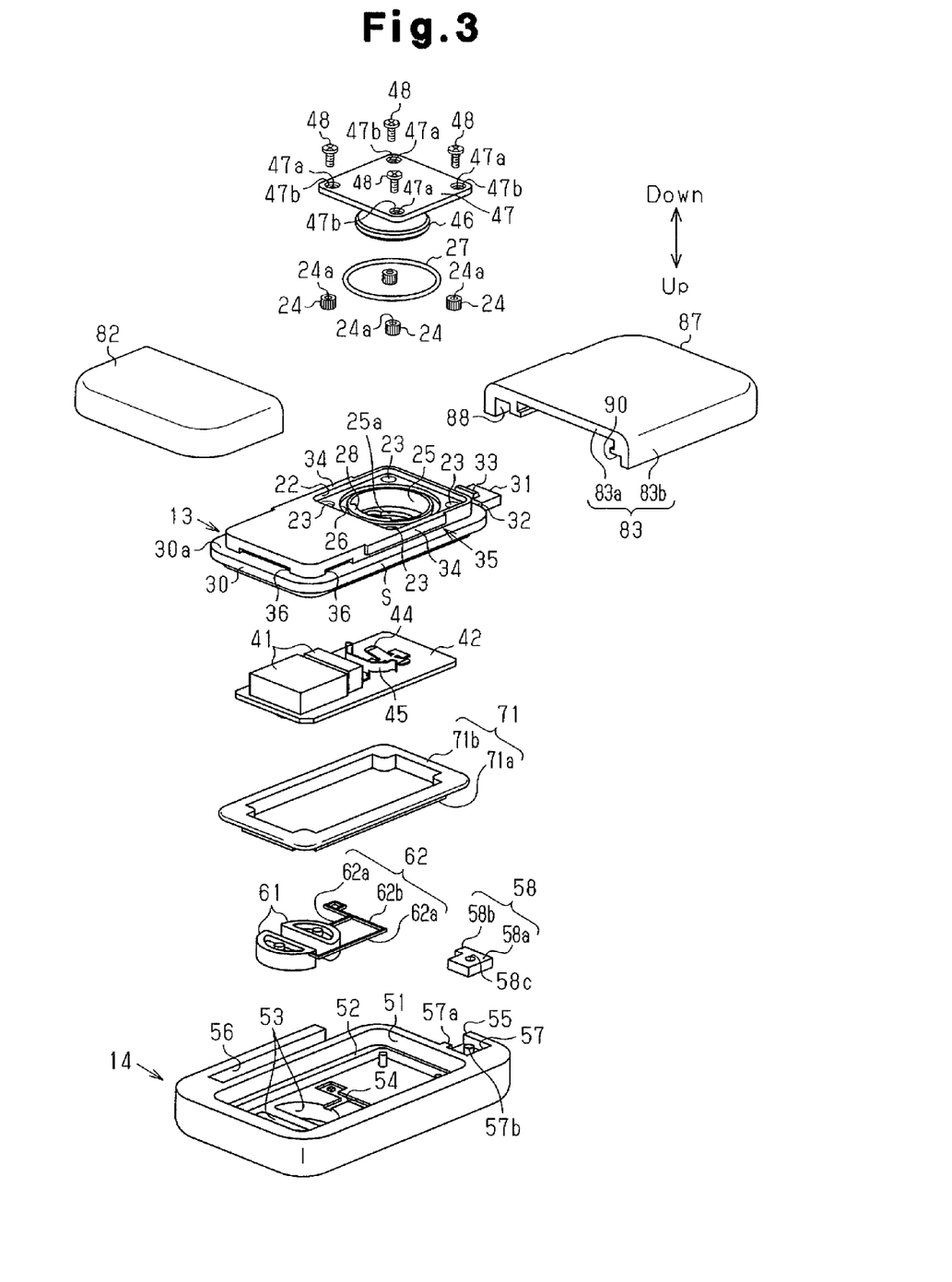
FIG. 3 is an exploded perspective view showing the portable device reversed from the state of FIG. 2.

Referring to FIG. 2, the first case part 13, which is integrally injection molded from a synthetic resin, is box-shaped. A board compartment 21 is defined in the first case part 13. As shown in FIG. 3, a square battery lid seat 22 is defined in a portion of the lower surface of the first case part 13. Bushing sockets 23 are formed in the four corners of the battery lid seat 22. A cylindrical bushing 24 is fitted into each bushing socket 23. A threaded hole 24a extends through the bushing 24.

A circular and hollow battery compartment 25 is defined in the central portion of the battery lid seat 22. An annular groove 26 is formed between the battery compartment 25 and the four bushing sockets 23. The groove 26 receives a rubber O-ring 27. As shown in FIG. 2, a through hole 25a extends through the bottom wall of the battery compartment 25. An opening 25b is formed in the side wall of the battery compartment 25. An arcuate stopper 28 is formed along the rim of the battery compartment 25 at the open end. The stopper 28 faces toward the inner side of the battery compartment 25.

Board supports 29 are formed on the inner surfaces of the two opposing long walls of the first case part 13. The board supports 29 extend in a direction orthogonal to the bottom surface of the first case part 13. Each board support 29 has an upper end located at the same level as the upper surface of the battery compartment 25.

A rectangular flange 30 extends along the peripheral surface of the first case part 13 at the middle of the first case part 13 in the heightwise direction. A plate-shaped tongue 31 extends from the portion of the flange 30 extending along the short wall of the first case part 13 located next to the battery compartment 25. The upper and lower surfaces of the tongue 31 are flush with the upper and lower surfaces of the flange 30 as viewed in FIG. 1A. A groove 32 having a square cross-section and functioning as a brittle portion, extends entirely across the tongue 31. Further, an engaging portion, or projection 33, extends across the lower surface of the tongue 31, as viewed in FIG. 3.

Rails 34 having a predetermined length extend parallel to and below the flange 30 along the two opposite long walls of the first case part 13, as viewed in FIG. 3. A guide groove 35 is defined between the flange 30 and each rail 34. Recesses 36 are formed in the outer side of the two long walls and one short wall of the first case part 13 near the battery compartment 25. The recesses 36 are formed so that they are located at a level that differs from the level of the rails 34 in the vertical direction.

Referring to FIG. 1, the board compartment 21 of the first case part 13 accommodates a circuit board 42. A microcomputer (now shown) and various electronic components 41, such as electronic devices that form a communication circuit, are connected to the circuit board 42. The circuit board 42 is rectangular and shaped in correspondence with the board compartment 21. Push switches (micro switches) 43 are arranged in parallel in the longitudinal direction on the upper surface of the circuit board 42. Each push switch 43 has a housing 43a, which is fixed to the circuit board 42, and an actuator 43b, which is exposed from the housing 43a. The actuator 43b is pushed to close a contact (not shown) arranged in the housing 43a. As a result, the push switch 43 sends a detection signal indicating that the contact has closed to the microcomputer arranged in the circuit board 42. In response to the detection signal from the push switch 43, the microcomputer externally transmits control information for locking or unlocking the vehicle doors and an ID signal, which contains an ID code of the microcomputer, from a communication circuit arranged on the circuit board 42.

A negative contact 44 and a positive contact 45 are arranged on the lower surface of the circuit board 42 as viewed in FIG. 1A. When the circuit board 42 is retained in the board compartment 21, the negative contact 44 is exposed to the battery compartment 25 through the through hole 25a. Further, when the circuit board 42 is retained in the board compartment 21, the positive contact 45 is exposed to the battery compartment 25 through the opening 25b.

The circuit board 42 is fitted into the board compartment 21 from above with the two push switches 43 facing an upward direction. Movement of the circuit board 42 into the board compartment 21 is restricted when the circuit board 42 abuts against the four board supports 29 and the upper surface of the battery compartment 25. The upper ends of the four board supports 29 and the upper surface of the battery compartment 25 are located at the same height from the bottom surface of the first case part 13. Thus, the circuit board 42 is held in a state parallel to the bottom surface of the first case part 13.

A battery 46, which supplies the electronic components 41 on the circuit board 42 with operational power, is retained in the battery compartment 25. In the preferred embodiment, the battery 46 is a coin-type battery. When the battery 46 is retained in the battery compartment 25, a battery lid 47 is attached to the battery lid seat 22. More specifically, as shown in FIG. 3, the battery lid 47 is a square plate shaped in correspondence with the battery lid seat 22. Insertion holes 47a extend through the four corners of the battery lid 47. When attaching the battery lid 47 to the battery lid seat 22, the insertion holes 47a are aligned with the threaded holes 24a of the corresponding bushings 24.

Screws 48 are inserted into the insertion holes 47a and mated with the threaded holes 24a of the bushings 24 to fix the battery lid 47 to the battery lid seat 22. Each screw 48 has a head, and each insertion hole 47a includes a counterbore 47b for receiving the head of the corresponding screw 48 such that the head does not project out of the surface of the battery lid 47. The upper surface of the battery 46 functions as a negative electrode 46a and the peripheral surface of the battery 46 functions as a positive electrode 46b. When the battery lid 47 is fixed to the battery lid seat 22, the negative electrode 46a of the battery 46 is forced against the negative contact 44, which is exposed to the battery compartment 25 through the through hole 25a. This ensures that the negative electrode 46a of the battery 46 contacts the negative contact 44 under pressure. Further, the positive electrode 46b of the battery 46 resiliently contacts the positive contact 45, which is exposed to the battery compartment 25 through the opening 25b.

Referring to FIG. 3, the second case part 14, which is integrally injection molded from a synthetic resin, is box-shaped. The opening of the second case part 14 defines a fitting portion 51 for receiving the first case part 13. The portion of the first case part 13 above the upper surface of the flange 30, as viewed in FIG. 1A, can be fitted into the fitting portion 51 in a state in which the circuit board 42 is attached to the first case part 13. A step 52 extends along the inner surface of the fitting portion 51. Two semicircular button receptacles 53 extend through the second case part 14 into the fitting portion 51. The two button receptacles 53 are spaced apart in the longitudinal direction of the second case part 14 facing opposite directions. When the first case part 13 having the circuit board 42 attached thereto is fitted into the fitting portion 51 of the second case part 14, the two button receptacles 53 are aligned with the actuators 43b of the push switches 43 on the circuit board 42. A U-shaped connection groove 54 is formed in the inner surface of the second case part 14 so as to connect the two button receptacles 53.

The second case part 14 has two opposite long walls and two opposite short walls. One of the short walls and one of the long walls are thicker than the other one of the short walls and the other one of the long walls. An L-shaped cutaway portion 55 is formed in the corner formed by the thicker long and short walls. The cutaway portion 55 continuously extends from the thick long side for about two thirds of the short wall. Further, an elongated groove 56 extends along the thick long wall. The elongated groove 56 has an end that opens to the cutaway portion 55. A hollow first lock member holder 57 is formed in the thick short wall. The first lock member holder 57 has an open portion 57a facing toward the cutaway portion 55. The first lock member holder 57 is in communication with the cutaway portion 55 through the open portion 57a. A positioning projection 57b is formed in the first lock member holder 57.

In a state in which the portion of the first case part 13 above the flange 30 is fitted into the fitting portion 51 of the second case part 14 so that the second case part 14 comes into contact with the flange 30, the first case part 13 and the second case part 14 are fastened together. In the preferred embodiment, the upper surface of the flange 30 and the lower surface of the second case part 14 are thermally welded together. In a state in which the first case part 13 and the second case part 14 are fastened to each other, the actuators 43b of the two push switches 43 on the circuit board 42 aligned with the two button receptacles 53 of the second case part 14.

Figure 4:
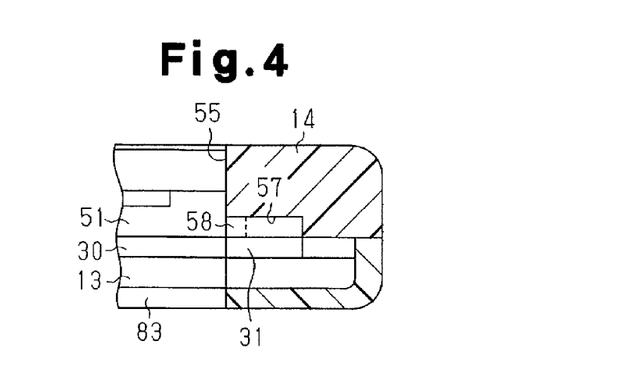
FIG. 4 is a cross-sectional view taken along line IV-IV in FIG. 1A.

The first lock member holder 57 of the second case part 14 retains a plate-like first lock member 58, or first lock member. The first lock member 58 is formed integrally from a metal material and includes a main portion 58a and an engagement portion 58b extending from the main portion 58a. The main portion 58a includes an insertion hole 58c for insertion of the positioning projection 57b formed in the first lock member holder 57. The first lock member 58 is arranged so that the positioning projection 57b is inserted into the insertion hole 58c, and the engagement portion 58b extends into the L-shaped cutaway portion 55 of the second case part 14 through the open portion 57a. Referring to FIG. 4, when the first case part 13 and the second case part 14 are fastened to each other, the tongue 31 of the first case part 13 closes the opening of the first lock member holder 57 in the second case part 14. Thus, in a state held between the tongue 31 and the opposing surface of the first lock member holder 57, the first lock member 58 is retained in the first lock member holder 57.

Referring to FIG. 2, two semicircular push buttons 61 are respectively inserted into the two button receptacles 53 from the inner side of the second case part 14. The two push buttons 61 are connected to each other by a U-shaped connection member 62, which is arranged in the connection groove 54 of the second case part 14. The push buttons 61 and the connection member 62 are integrally injection molded from a synthetic resin. As shown in FIG. 1, when arranged in the button receptacles 53 and connection groove 54 of the second case part 14, the push buttons 61 and the connection member 62 are flush with the inner surface of the second case part 14. As shown in FIG. 2, the connection member 62 includes two arms 62a, which are respectively connected to the two push buttons 61, and a link 62b connected to the arms 62a. The arms 62a are flexibly connected to the arms 62a so that the two push buttons 61 can be pushed independently from each other.

A box-shaped packing 71 having an open lower portion as viewed in FIG. 1A is arranged between the first case part 13 and the second case part 14. The packing 71 is formed integrally from a rubber material, such as nitrile rubber, urethane rubber, or silicon rubber. The packing 71 includes a main body 71a, which has an open lower portion, and a lip 71b, which extends along the periphery of open end of the main body 71a. The main body 71a is shaped in correspondence with the inner side of the step 52 in the second case part 14, and the lip 71b is arranged on the step 52.

As shown in FIG. 1A, when the packing 71 is arranged between the first case part 13 and the second case part 14, the lip 71b is arranged between the open end surface of the first case part 13 and the open end surface of the fitting portion 51 in a state slightly compressed in the vertical direction. This seals the first case part 13 and the second case part 14 in a manner impervious to liquids.

When the packing 71 is arranged between the first case part 13 and the second case part 14, the upper surface of the main body 71a is held in contact with the opposing inner surface of the second case part 14. Thus, the two push buttons 61 and the connection member 62 are held in a state accommodated in the two button receptacles 53 and the connection groove 54. Contact of the two push buttons 61 and the connection member 62 with the main body 71a restricts the downward movement of the two push buttons 61 and the connection member 62. When any of the two push buttons 61 are pushed, the main body 71a resiliently deforms in an inward direction. This pushes the actuators 43b of the corresponding push switches 43 on the circuit board 42 with the main body 71a of the packing 71.

In a state in which the packing 71 is arranged between the first case part 13 and the second case part 14, the main body 71a separates the two button receptacles 53 and the two push buttons 61 from the inner side of the second case part 14, which accommodates the circuit board 42 in the board compartment 21. Thus, even when liquid, such as water, enters the button receptacles 53 through gaps formed around the corresponding push buttons 61, the liquid does not reach the circuit board 42. Since the main body 71a is formed integrally with the lip 71b, which is held between the open end surface of the first case part 13 and the open end surface of the fitting portion 51 in a slightly compressed state, liquid entering the button receptacles 53 through gaps formed around the push buttons 61 does not enter the inner side of the packing 71.

As shown in FIG. 1A, the cover 81 includes a fixed cover piece 82 and a movable cover piece 83. The movable cover piece 83 covers the battery compartment 25 and the fixed cover piece 82 covers the remaining portion of the first case part 13. When joined with each other, the fixed cover piece 82 and the movable cover piece 83 form a box having an open upper portion.

Referring to FIG. 2, the fixed cover piece 82 is integrally injection molded from a synthetic resin. The fixed cover piece 82 includes a bottom wall 82a and a U-shaped side wall 82b extending along the periphery of the bottom wall 82a. The fixed cover piece 82 has an open lateral side. A U-shaped step 84 extends along the inner surface of the side wall 82b. Three projections 85 are formed on the inner surfaces of the side wall 83b. The projections 85 are arranged in correspondence with the three recesses 36 of the first case part 13.

One of the two opposing short walls of the fixed cover piece 82 is thicker than the other one. An elongated groove 86 is formed in the thicker short wall. The elongated groove 86 has an open end at the open lateral side of the fixed cover piece 82. Further, the elongated groove 86 has a width that is the same as that of the elongated groove 56 in the second case part 14.

The fixed cover piece 82 is joined with the first case part 13, and the three projections 85 are engaged with the three recesses 36 to fasten the fixed cover piece 82 to the first case part 13.

The movable cover piece 83 is integrally injection molded from a synthetic resin. The movable cover piece 83 includes a bottom wall 83a and a U-shaped side wall 83b extending along the periphery of the bottom wall 82a. The movable cover piece 83 has an open lateral side. One of the two opposing long walls of the movable cover piece 83 is thicker than the other one. The movable cover piece 83 has an L-shaped cutaway portion 87 at a corner formed by the thicker long wall and the adjacent short wall. When the movable cover piece 83 is attached to the first case part 13, the cutaway portion 87 is arranged in correspondence with the cutaway portion 55 of the second case part 14.

An elongated groove 88 extends along the thicker long wall of the movable cover piece 83. One end of the elongated groove 88 opens into the cutaway portion 87. A first step 89 extends along the inner side of the thicker long wall on the bottom surface of the movable cover piece 83. A second step 90 extends along the inner sides of the thinner long wall and the short wall on the bottom surface of the movable cover piece 83. A rail 91 extends parallel to the long walls along each of the steps 89 and 90. The two rails 91 are inserted into and guided by the two guide grooves 35 of the first case part 13. An engaged portion, or recess 92, which is engageable with the projection 33, is formed in the second step 90 in a portion corresponding to the short wall.

The movable cover piece 83 is attached to the first case part 13 in a detachable manner by inserting the two rails 91 into the two guide grooves 35 of the first case part 13 and sliding the movable cover piece 83 toward the fixed cover piece 82. The movement of the movable cover piece 83 in the attaching direction is restricted by the abutment of the movable cover piece 83 against the fixed cover piece 82. Further, the engagement of the rails 91 of the movable cover piece 83 with the corresponding rails 34 of the first case part 13 prevents the movable cover piece 83 from falling off the first case part 13. Additionally, the projection 33 of the first case part 13 is engaged with the recess 92 of the movable cover piece 83. This restricts movement of the movable cover piece 83 in a detaching direction of the movable cover piece 83 and prevents the movable cover piece 83 from falling off the first case part 13.

Figure 5:
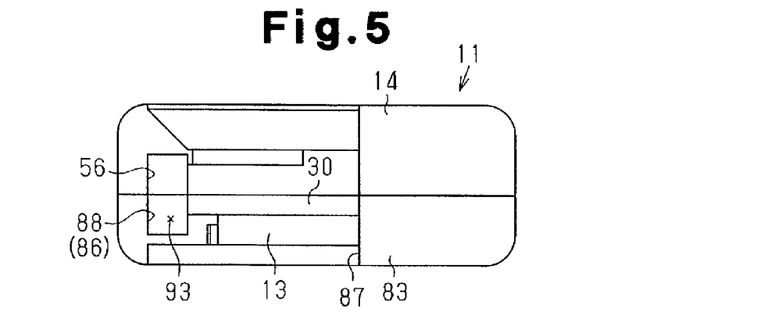
FIG. 5 is a side view showing the portable device when viewed in the direction of arrow V in FIG. 1B.
Figure 6A:
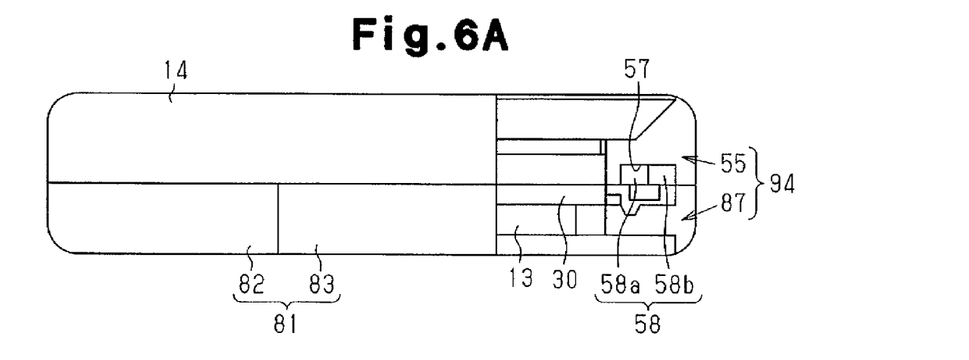
FIG. 6A is a side view showing the portable device in a state in which a mechanical key is removed therefrom when viewed in the direction of arrow VI in FIG. 1B.
Figure 6B:
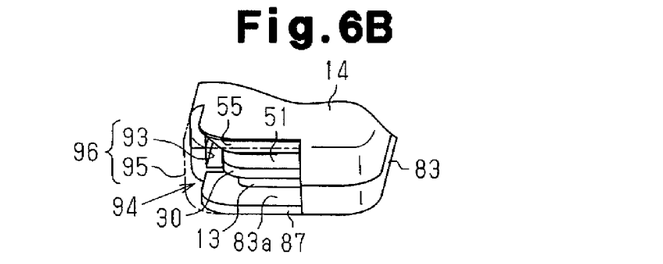
FIG. 6B is a schematic perspective view showing the portable device in a state in which the mechanical key is removed therefrom.

Referring to FIG. 5, in a state in which the fixed cover piece 82 and the movable cover piece 83 are attached to the first case part 13, a key plate holder 93 is defined by the elongated groove 56 of the second case part 14, the side surface of the flange 30 of the first case part 13 that is flush with the inner surface of the elongated groove 56, the elongated groove 86 of the fixed cover piece 82, and the elongated groove 88 of the movable cover piece 83. As shown in FIGS. 6A and 6B, in a state in which the fixed cover piece 82 and the movable cover piece 83 are attached to the first case part 13, the L-shaped cutaway portion 55 of the second case part 14 and the L-shaped cutaway portion 87 of the movable cover piece 83 define a key inlet 94. As shown by the broken lines in FIG. 6B, the inner surfaces of the second case part 14, the first case part 13, and the movable cover piece 83 that are exposed in the key inlet 94 define a grip holder 95. The grip holder 95 and the key plate holder 93 define a mechanical key holder 96 for accommodating a mechanical key 101.

The mechanical key 101 is an emergency key used when the battery is drained or when the portable device 11 is not functioning properly. The mechanical key 101 is used to mechanically lock and unlock a vehicle door.

As shown in FIG. 2, the mechanical key 101 is L-shaped and includes a key plate 102 and a grip 103 fixed to one end of the key plate 102. The key plate 102 has a width and length set so that it can be accommodated in the key plate holder 93 of the case 12. The grip 103 extends orthogonal to the key plate 102 and is accommodated in the grip holder 95 of the case 12.

When the key plate 102 is accommodated in the key plate holder 93 and the grip 103 is accommodated in the grip holder 95, that is, when the mechanical key 101 is accommodated in the mechanical key holder 96, the outer surface of the grip 103 extends continuously from the outer surface of the case 12, as shown in FIG. 1B. Thus, the outer surface of the grip 103 serves as part of an ornamental surface of the case 12.

Figure 7A:
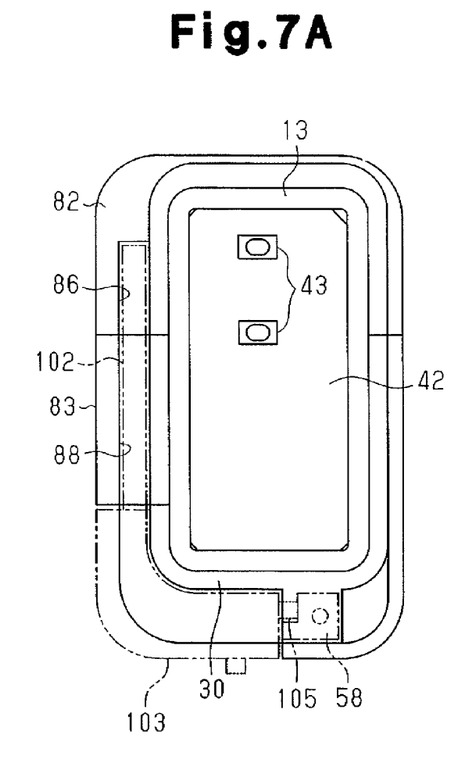
FIG. 7A is a plan view showing the portable device in a state in which a second case part is removed therefrom.
Figure 7B:
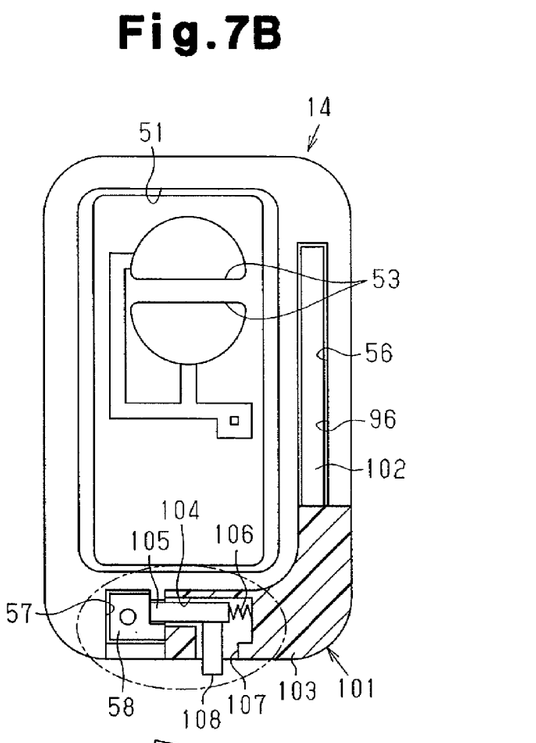
FIG. 7B is a lower view showing the second case part and the mechanical key.
Figure 7C:
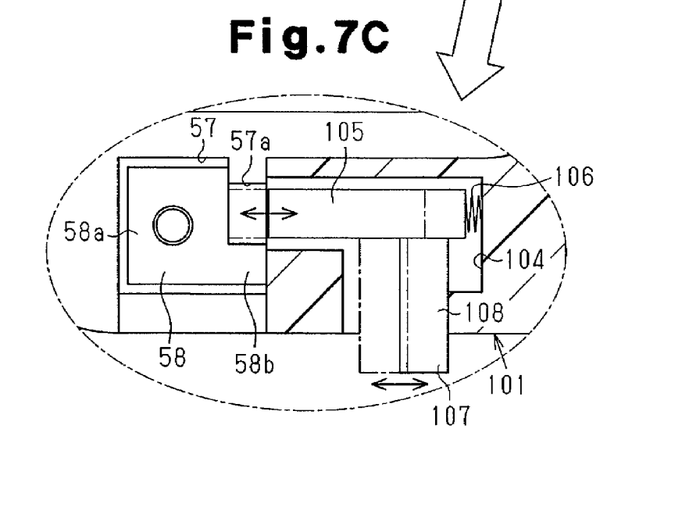
FIG. 7C is an enlarged view of FIG. 7B showing an engagement structure for second case part and the mechanical key.

Referring to FIGS. 7B and 7C, the end of the grip 103 opposite the end connected to the key plate 102 includes a second lock member holder 104. When the mechanical key 101 is accommodated in the mechanical key holder 96, the second lock member holder 104 is arranged to correspond with the open portion 57a of the first lock member holder 57. The second lock member holder 104 accommodates a second lock member 105, which is movable in the direction the grip 103 extends. A coil spring 106 is arranged between the second lock member 105 and the surface of the second lock member holder 104 opposed to second lock member 105. The force of the coil spring 106 constantly urges the second lock member 105 outward from the second lock member holder 104.

A lever slot 107, which is in communication with the second lock member holder 104, is formed in the surface of the grip 103. A slide lever 108 extends through the lever slot 107. The slide lever 108 has one end fixed to the second lock member 105 and another end exposed from the grip 103. Thus, the slide lever 108 moves integrally with the second lock member 105. The movement of the second lock member 105 and the slide lever 108 in the extending direction of the grip 103 is restricted by the abutment of the slide lever 108 against the wall of the lever slot 107. The slide lever 108 moves the second lock member 105 between a lock position shown by the broken lines in FIG. 7C and an unlock position shown by the solid lines in FIG. 7C.

When the mechanical key 101 is held in the mechanical key holder 96 of the case 12, the force of the coil spring 106 projects the second lock member 105 out of the grip 103. As a result, the second lock member 105 extends into the first lock member holder 57 through the open portion 57a of the case 12 and engages the engagement portion 58b of the first lock member 58. In this state, the second lock member 105 is located at the lock position. When located at the lock position, the engagement of the second lock member 105 with the engagement portion 58b of the first lock member 58 restricts the removal of the mechanical key 101 from the mechanical key holder 96. To arrange the second lock member 105 at the unlock position, the second lock member 105 is moved inward into the second lock member holder 104 against the force of the coil spring 106 to disengage the second lock member 105 from the first lock member 58. When the second lock member 105 is located at the unlock position, the mechanical key 101 is removable from the mechanical key holder 96.

The procedures for assembling the portable device 11 will now be discussed.

The second case part 14 is first arranged on a table with the fitting portion 51 facing upwards. The two push buttons 61 and the connection member 62 are arranged in the two button receptacles 53 and the connection groove 54 of the second case part 14. In this state, the push buttons 61 are flush with the inner surface of the second case part 14.

With its opening facing upwards, the packing 71 is arranged in the fitting portion 51. In this state, the lip 71b of the packing 71 is held on the step 52 of the second case part 14.

Next, the circuit board 42 is fitted into the board compartment 21 of the first case part 13. In this state, the two push switches 43 are exposed, and the negative contact 44 and positive contact 45 are arranged to correspond to the battery compartment 25. Then, the first case part 13 is fitted into the fitting portion 51 of the second case part 14 with the circuit board 42 held in the board compartment 21. The movement of the first case part 13 into the second case part 14 is restricted when the flange 30 of the first case part 13 abuts against the open end surface of the second case part 14.

Then, thermal welding is performed to join the flange 30 of the first case part 13 with the open end surface of the second case part 14. In the preferred embodiment, laser welding is performed with a laser welding device to join the first case part 13 and the second case part 14.

Subsequently, the battery 46 is arranged in the battery compartment 25, and the O-ring 27 is attached to the groove 26 of the battery lid seat 22. Further, the battery lid 47 is fixed to the battery lid seat 22 by fastening the screws 48 to the threaded holes 24a of the bushings 24. This holds the battery 46 in the battery compartment 25, and fixes the battery lid 47 to the first case part 13.

Afterwards, the fixed cover piece 82 is placed on the first case part 13, and the three projections 85 are engaged with the three recesses 36. This fastens the fixed cover piece 82 to the first case part 13.

Then, the movable cover piece 83 is arranged beside the first case part 13 for attachment. The two rails 91 formed in the movable cover piece 83 are inserted into the two guide grooves 35 of the first case part 13. The movement of the movable cover piece 83 toward the fixed cover piece 82 is restricted when the side wall 83b and bottom wall 83a of the movable cover piece 83 abut against the side wall 82b and bottom wall 82a of the fixed cover piece 82. In this state, the recess 92 of the movable cover piece 83 is engaged with the projection 33 of the first case part 13. This restricts removal of the movable cover piece 83 and prevents the movable cover piece 83 from moving away from the fixed cover piece 82.

The attachment of the movable cover piece 83 to the first case part 13 forms the key plate holder 93, the grip holder 95, and the key inlet 94. The slide lever 108 is operated to hold the second lock member 105 at the unlock position. Then, the mechanical key 101 is inserted into the key inlet 94 from the key plate 102. Referring to FIGS. 7A and 7B, the movement of the mechanical key 101 into the mechanical key holder 96 is restricted by the abutment of the grip 103 against the outer wall of the fitting portion 51, the edge of the elongated groove 56 in the second case part 14, the flange 30 of the first case part 13, and the edge of the elongated groove 88 in the movable cover piece 83.

In this state, the second lock member 105 is located at a position corresponding to the space between the open portion 57a of the first lock member holder 57 and the engagement portion 58b of the first lock member 58. Then, the slide lever 108 is released, and the force of the coil spring 106 moves the second lock member 105 to the lock position so that the distal end of the second lock member 105 engages the engagement portion 58b of the first lock member 58. As a result, the mechanical key 101 is prevented from falling out of the mechanical key holder 96.

This completes the assembly of the portable device 11. In this manner, the push buttons 61, the packing 71, and the first case part 13 are stacked on the second case part 14. In the stacked state, laser welding is performed to join the first case part 13 and the second case part 14 to each other in a superimposed state. This is advantageous in that the second case part 14 does not have to be flipped over during the assembly of the portable device 11. After the first case part 13 is joined with the second case part 14, the fixed cover piece 82, the movable cover piece 83, and the mechanical key 101 are attached to complete the assembly of the portable device 11. This improves the assembling efficiency of the portable device 11.

The procedures for joining the first case part 13 and the second case part 14 will now be discussed. In the preferred embodiment, a laser welding device 111 is used to thermally weld and join the first case part 13 and the second case part 14 to each other in a superimposed state.

Figure 8:
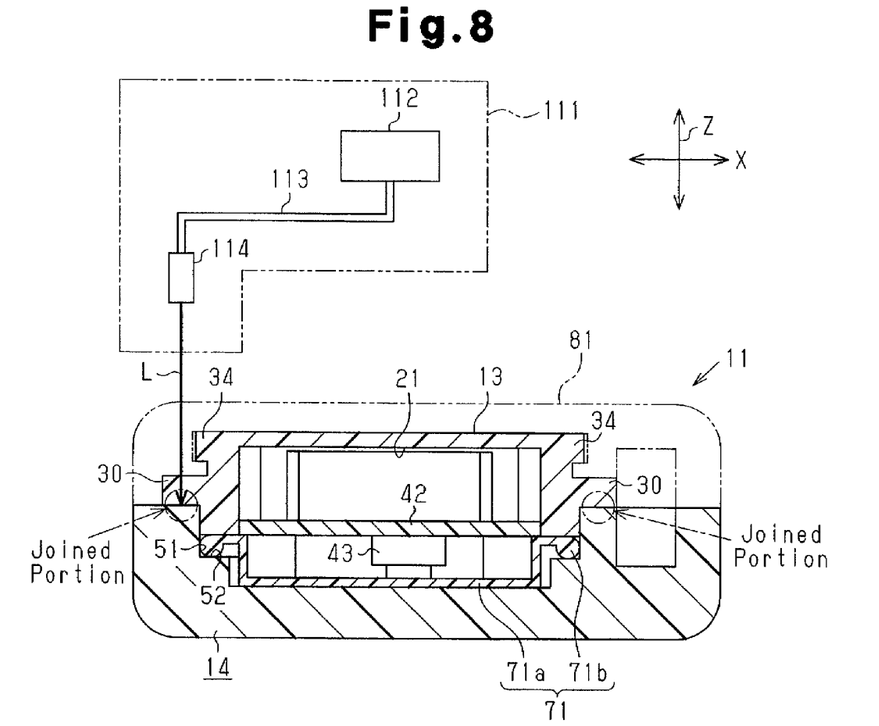
FIG. 8 is a schematic diagram showing a laser welding device.

The laser welding device 111 will first be briefly described. Referring to FIG. 8, the laser welding device 111 generates a laser beam L with a laser beam generator 112. The laser beam L travels through an optical fiber 113 and a converging lens 114. Then, the laser beam L is directed toward welded portions of two resin parts that are joined with each other. The laser beam source used for such laser welding may be an yttrium aluminum garnet (YAG) laser, a glass laser, a ruby laser, a helium-neon gas laser, an argon laser, a fiber laser, or a semiconductor laser. Further, the laser beam generator 112 is fixed to a housing (not shown) of the laser welding device 111. The converging lens 114 is driven by a drive device (not shown) and is movable in an XYZ coordinate system in the directions of the X, Y, and Z axes. Two parts (in the preferred embodiment, the first case part 13 and the second case part 14) are joined with each other and supported by a parts holder. In this state, the drive device is driven to move the converging lens 114 relative to the parts in order to direct the laser beam L toward the joining portions of the parts. Instead of the converging lens 114 being moved, the parts holder may be moved.

The material of the first case part 13 and second case part 14 that are laser welded and joined with each other will now be described. The synthetic resin used to form the first case part 13 and second case part 14 may be a non-crystalline resin, such as polystyrene, polyethylene, and polycarbonate, or a crystalline resin, such as polypropylene, polybutylene terephthalate, polyethylene terephthalate, polyamide, and polyacetal. In the preferred embodiment, polycarbonate is used.

The first case part 13 transmits the laser beam L, or has a transmittance with respect to the spectrum of the laser beam L. The second case part 14 absorbs the spectrum of the laser beam L, or has an absorbance with respect to the spectrum of the laser beam L. The transmittance and absorbance of the first case part 13 and second case part 14 are dependent on the amount and dispersion of an additive (colorant), such as dye and pigment, in the synthetic resin forming the first case part 13 and second case part 14.

In this embodiment, pigment of a predetermined color (e.g., carbon black) is added as a laser beam absorption colorant to the synthetic resin forming the second case part 14. The amount and dispersion of the absorption colorant for the synthetic resin is determined so that the second case part 14 has the required laser beam absorbance for generating the necessary heat. The laser light absorption colorant may be a pigment colorant or a dye colorant. Such pigment colorant and dye colorant may be combined to generate the necessary heat. This would enable the welding conditions to be flexible. Carbon black, which is described above, is generally used as a pigment colorant.

In the synthetic resin forming the first case part 13, a dye having the same color as the pigment used for the second case part 14 is added as a coloring substance. The first case part 13 has the same color as the second case part 14 to improve the aesthetic appeal of the case 12. The type, amount, and dispersion of the dye for the synthetic resin of the first case part 13 are determined so that the first case part 13 has the required laser beam transmittance. The first case part 13 differs from the second case part 14 in that a dye is added to the synthetic resin forming the first case part 13. This is for the following reasons. A pigment does not dissolve in a synthetic resin and is dispersed as grains (coagulations). Thus, the pigment absorbs and diffuses (reflects) the laser beam L and renders the transmission of the laser beam L difficult. In comparison, a dye is dissolved in the synthetic resin at a molecular level. This enables uniform coloring and stabilizes the color phase. A dye has a high light transmission property although this is affected by the synthetic resin to which the dye is added. Thus, in the preferred embodiment, pigment is added to the synthetic resin of the second case part 14, and dye is added to the synthetic resin of the first case part 13. However, a dye does not necessarily have to be added to the synthetic resin material of the first case part 13 as long as the first case part 13 sufficiently transmits the laser beam L.

The type (color), amount, and dispersion of the pigment and dye are determined so that the first case part 13 and the second case part 14 have the same reflectivity (spectral reflectance characteristic) of about 10%. This colors the first case part 13 and the second case part 14 with the same predetermined color so that they have the same appearance. If the first case part 13 and the second case part 14 appear to have the same color, it will not be noticed that the transmittance and absorbance of the laser beam L are adjusted.

The joining of the first case part 13 and the second case part 14 with the laser welding device 111 will now be described. In a state in which the circuit board 42 is facing toward the second case part 14, the first case part 13 is fitted into the fitting portion 51 of the second case part 14. In a state in which the flange 30 of the first case part 13 is engaged with the open end surface of the second case part 14, the first case part 13 and second case part 14 are supported by and fixed to the parts holder of the laser welding device 111.

Figure 9:
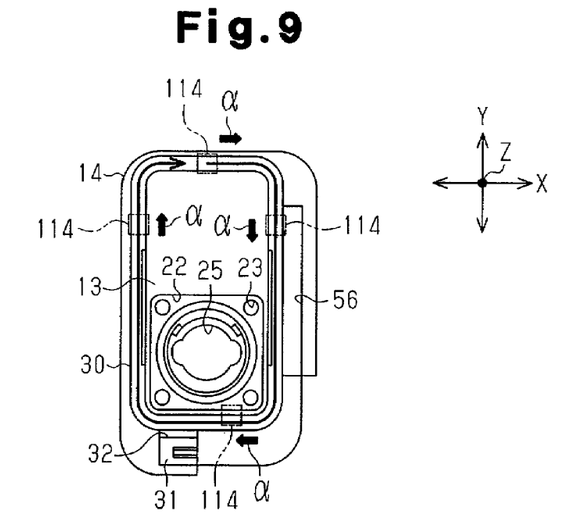
FIG. 9 is a lower view showing a laser beam emission route along the case in a state in which a cover is removed therefrom.

Then, a laser beam L is emitted and directed via the converging lens 114 toward the flange 30 from the first case part 13. More specifically, as shown by arrow α in FIG. 9, the laser beam L is directed toward the flange 30 while continuously moving the converging lens 114 along the flange 30 of the first case part 13. The laser beam L emitted through the converging lens 114 and transmitted through the flange 30 reaches the open end surface of the second case part 14. The energy of the laser beam L is absorbed at the portion of the open end surface of the joined with the flange 30. The absorption of the laser energy generates heat, which fuses the joined portions (joined surfaces) of the flange 30 and the second case part 14. Afterwards, the fused portions, or the joined portions of the flange 30 and the second case part 14, are cooled and solidified. This joins the flange 30 of the first case part 13 with the open end surface of the second case part 14. The flange 30 of the first case part 13 and the open end surface of the second case part 14 may be partially joined with each other at a number of locations. In the preferred embodiment, the flange 30 functions as the joined portion of the first case part 13, and the open end surface of the second case part 14 as the joined portion of the second case part 14.

In addition to the above-described laser fusing, known methods for thermally welding synthetic resin material include ultrasonic welding, vibration welding, and hot plate welding. Ultrasonic welding, vibration welding, and hot plate welding may be performed to join the first case part 13 and the second case part 14. However, it is preferred that laser welding be performed to join the first case part 13 and the second case part 14.

Ultrasonic welding is performed by simultaneously applying pressure and fine vibrations to the contacting surfaces of the two resin members that are welded together. This generates high friction heat and fuses the resin. However, the heating produces fine resin particles. Further, the fine vibrations may generate vibration stress that afflicts damages to the first case part 13, the second case part 14, and the circuit board 42. Vibration welding is performed by applying pressure and friction to one of two members that are welded with each other. This generates high friction heat that fuses the resin. Although the vibration stress that is generated is less as compared with ultrasonic welding, the heating produces fine particles. Hot plate welding is performed to apply heat to the entire product with a heater plate or the like in order to cause fusion. Hot plate welding does not produce resin particles. However, heat cannot be generated locally. Thus, the application of hot plate heating to a product containing the circuit board 42 is difficult. Laser welding does not cause such problems and does not affect the first case part 13, the second case part 14, and the circuit board 42 with heat or vibrations in such a manner.

When or after heating and fusing joined portions with the laser beam L, pressure may be applied to the joined portions to further ensure the joining of the first case part 13 and the second case part 14. For example, the first case part 13 may be pressed toward the second case part 14 with a pressing means, such as a roller (not shown). In this case, the pressing means follows the movement of the converging lens 114. Further, the pressing means continues to apply pressure until the joined portions of the first case part 13 and the second case part 14 are cooled. This prevents the generation of voids (bubbles) in the joined portions of the first case part 13 and the second case part 14.

The preferred embodiment has the advantages described below.

(1) The case 12 of the portable device 11 includes the first case part 13, which has the board compartment 21 to accommodate the circuit board 42, and the second case part 14, which covers the circuit board 42 that is accommodated in the board compartment 21 of the first case part 13. The first case part 13 and the second case part 14 are joined with each other in a superimposed state and unitized.

Therefore, the first case part 13 and the second case part 14 cannot be disassembled. To remove the circuit board 42, the joining of the first case part 13 and the second case part 14 must be broken. However, if the joining of the first case part 13 and the second case part 14 is broken, it would become difficult to join the first case part 13 and the second case part 14 again. Thus, a person who breaks the first case part 13 and the second case part 14 to remove the circuit board 42 would not be able to return the first case part 13 and the second case part 14 to the original assembled state. Accordingly, the user would easily recognize removal of the circuit board 42.

(2) The first case part 13 is formed from a synthetic resin material that transmits the laser beam L. Further, the first case part 13 includes the flange 30, which is joined with the second case part 14. The second case part 14 is formed from a synthetic resin material that absorbs the laser beam L. The peripheral portion of the second case part 14 is joined with the first case part 13. The flange 30 of the first case part 13 is stacked on the open end surface of the second case part 14. In this stacked state, the laser beam L is emitted from the first case part 13 toward the second case part 14 to thermally weld the flange 30 and the open end surface of the second case part 14.

The laser beam L is transmitted through the flange 30 of the first case part 13 and absorbed by the open end surface of the second case part 14. This heats and fuses the joined surfaces (joined portions) of the flange 30 and the open end surface of the second case part 14. Such laser welding locally heats the welded portions with the laser beam L. This reduces the influence of heat on the circuit board 42 when joining the first case part 13 and the second case part 14. Further, mechanical vibrations are not generated. Thus, resin particles that may collect on and affect the circuit board 42 are not produced. Accordingly, the first case part 13 and the second case part 14 are joined with each other without affecting the first case part 13, the second case part 14, and the circuit board 42.

(3) The second case part 14 is arranged to entirely cover the side of the first case part 13 that includes the board compartment 21. Further, the cover 81 (i.e., the fixed cover piece 82 and the movable cover piece 83), which functions as one element forming the case 12 of the portable device 11, entirely covers the side of the first case part 13 opposite the side including the board compartment 21. Additionally, the second case part 14 and the cover 81 are each formed from a synthetic resin material having light resistance to ultraviolet light and xenon.

Generally, laser welding characteristics (transmittance of laser light) are contradictory to ultraviolet light resistance (weather resistance). In the preferred embodiment, the first case part 13, which is formed from a synthetic resin that transmits the laser beam L, is covered by the second case part 14 and the cover 81, which are formed from a synthetic resin that is ultraviolet light resistant. In other words, the first case part 13, which has low light resistance, is covered by the second case part 14 and the cover 81, which have high light resistance. The first case part 13, the second case part 14, and the cover 81 are each formed from a suitable material having characteristics that are in accordance with these requirements. This ensures that the required laser welding characteristic and light resistance are obtained. A light resistance agent may be added to the synthetic resin material that forms the second case part 14 and the cover 81.

(4) The cover 81 is divided into the movable cover piece 83, which corresponds to the battery compartment 25, and the fixed cover piece 82. By sliding the movable cover piece 83 along the first case part 13, the movable cover piece 83 is attached to the first case part 13. The fixed cover piece 82 is fixed to the first case part 13. Further, by sliding the movable cover piece 83 along the first case part 13, the movable cover piece 83 may be detached from the first case part 13. This improves efficiency when replacing the battery 46. Further, the battery 46 may be replaced without disassembling the first case part 13 and the second case part 14. Thus, the circuit board 42 is not exposed from the case 12 when changing batteries.

(5) The packing 71, which is formed from a rubber material, is held between the second case part 14 and the board compartment 21 of the first case part 13. This seals the first case part 13 and the second case part 14 in a manner impervious to liquids. Further, since the packing 71 is held between the first case part 13 and the second case part 14, there is no need for a means that fixes the packing 71 to the case 12. This reduces components and prevents enlargement of the case 12.

(6) The wall of the second case part 14 facing towards the circuit board 42 includes the button receptacles 53, which accommodates the push buttons 61 for operating the push switches 43 on the circuit board 42. The packing 71 includes the lip 71b, which corresponds to the open end surface of the board compartment 21 in the first case part 13, and the main body 71a, which covers the circuit board 42 arranged in the board compartment 21 of the first case part 13.

The lip 71b seals the first case part 13 and the second case part 14 in a manner impervious to liquids. Further, the main body 71a covers the circuit board 42. Thus, even if a liquid, such as water, enters the button receptacles 53 through gaps around the push buttons 61, the liquid does not reach the circuit board 42. More specifically, the main body 71a is formed integrally with the lip 71b, which is arranged in a compressed state between the open end surface of the first case part 13 and the open end surface of the fitting portion 51. Thus, liquid such as water that enters the button receptacles 53 through gaps around the push buttons 61 does not enter the main body 71a. This provides a waterproof structure for the circuit board 42. Further, the lip 71b and the main body 71a that are formed integrally with each other reduce the number of components.

(7) The tongue 31 extends from outward from the flange 30 of the first case part 13 in the detachment direction of the movable cover piece 83. Further, the projection 33 projects from the tongue 31 towards the inner surface of the movable cover piece 83. The inner surface of the movable cover piece 83 includes the recess 36, which is engageable with the projection 33. Engagement between the projection 33 of the first case part 13 and the recess 36 of the movable cover piece 83 prevents the movable cover piece 83 from falling off the first case part 13.

(8) The mechanical key holder 96 for accommodating the mechanical key 101 in a removable manner extends in the sliding direction of the movable cover piece 83 and is formed by the first case part 13, the second case part 14, and the cover 81. Further, the first lock member holder 57 for accommodating the first lock member 58, which is engageable with part of the mechanical key 101, is defined in the second case part 14 at a portion corresponding to the tongue 31. The grip 103 of the mechanical key 101 includes the second lock member 105, which is movable between the lock position where the second lock member 105 is engaged with the first lock member 58 and the unlock position where the second lock member 105 is disengaged from the first lock member 58. When the first case part 13 and the second case part 14 are joined with each other, the first lock member 58 is held in the first lock member holder 57 by the tongue 31.

Accordingly, the tongue 31 of the first case part 13 functions as a means for holding the first lock member 58 in the first lock member holder 57 in addition to a means for preventing the movable cover piece 83 from falling off the first case part 13. Thus, a separate means for holding the first lock member 58 in the second case part 14 is not necessary. This reduces the number of components and prevents enlargement of the case 12.

(9) The first case part 13 has the groove 32, which has a square cross-section and functions as a brittle portion. The groove 32, extends along the entire basal portion of tongue 31, and becomes exposed when the movable cover piece 83 is removed from the case 12. The groove 32 reduces the thickness of the tongue 31 at the basal portion and makes this portion of the tongue 31 brittle and weaker than other portions of the first case part 13.

To remove the circuit board 42, the first case part 13 and the second case part 14 must be disassembled. In the preferred embodiment, if the first case part 13 and the second case part were to be disjoined, this would break the groove 32, or the brittle portion of the first case part 13. In such a case, the user would be able to visually recognize breakage of the first case part 13 and become aware that the circuit board 42 had been removed. In other words, the user would become aware that the circuit board 42 had been removed from the case 12 from the breakage of the first case part 13.

It is assumed that the tongue 31, which extends from the side surface of the flange 30 in the first case part 13, has a lower joining strength than the main portion of the first case part 13. This is because the main portion of the first case part 13 at the open end surface of the board compartment 21 entirely undergoes thermal welding. It is thus extremely effective to arrange the groove 32 as the brittle portion at the basal portion of the tongue 31 that has low strength.

It should be apparent to those skilled in the art that the present invention may be embodied in many other specific forms without departing from the spirit or scope of the invention. Particularly, it should be understood that the present invention may be embodied in the following forms.

In the preferred embodiment, the movable cover piece 83 is attached to the first case part 13 by sliding the movable cover piece 83 along the first case part 13. However, the movable cover piece 83 may be superimposed with the first case part 13 for attachment. In this case, the movable cover piece 83 and the first case part 13 may be fitted together and fixed with each other.

The cover 81 (i.e., fixed cover piece 82 and movable cover piece 83) may be eliminated. In this case, the mechanical key holder 96 is formed in the first case part 13. A lock mechanism engageable with the second lock member 105 of the mechanical key 101 is also arranged in the first case part 13. In this case, the exposed outer surface of the first case part 13 forms the ornamental surface of the portable device 11.

In the preferred embodiment, thermal welding (laser welding) is performed to join the first case part 13 and the second case part 14. However, an adhesive agent may be used to join the first case part 13 and the second case part 14. Further, special bolts requiring special tools for removal, such as threading bolts or one way bolts (fastening-only bolts), may be used to join the first case part 13 and the second case part 14. This would also render disjoining of the first case part 13 and the second case part 14 difficult in comparison with when using normal screws to join the first case part 13 and the second case part 14.

In the preferred embodiment, the second case part 14 has two button receptacles 53. However, the second case part 14 may have only one button receptacle 53. In this case, only one push button 61 and one push switch 43 are used. In this case, the push button 61 may be pushed consecutively to alternately lock and unlock the vehicle doors. Alternatively, the second case part 14 may have three or more button receptacles 53. In this case, the same number of push buttons 61 and push switches 43 are used. In addition to locking and unlocking the vehicle doors, the push buttons 61 may be used to lock and unlock the trunk or hood of the vehicle.

In the preferred embodiment, the projection 33 of the first case part 13 is engaged with the recess 92 of the movable cover piece 83 to prevent the movable cover piece 83 from falling off the first case part 13. However, the recess 92 may be arranged on the first case part 13, and the projection 33 may be arranged on the movable cover piece 83. This would also prevent the movable cover piece 83 from falling off the first case part 13.

The fixed cover piece 82 may be joined with the first case part 13 by an adhesive agent, special screws, and thermal welding. If the first case part 13 and the fixed cover piece 82 are disjoined at the joined portions, damages would be visible at the joined portions. This would enable the user to be aware that the circuit board 42 has been removed when finding such damages. In this manner, by inflicting two types of damages, one between the first case part 13 and the second case part 14 and another between the first case part 13 and the fixed cover piece 82, the visual effect leading to awareness of the circuit board removal is further improved.

Figure 10A:
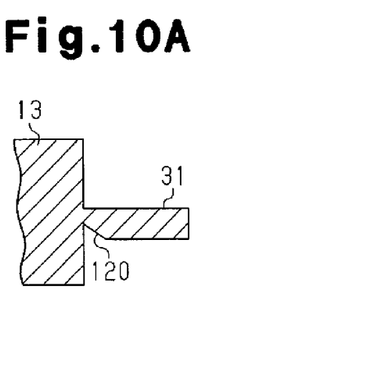
FIGS. 10A, 10B, and 10C are cross-sectional views showing brittle portions in the second case parts of other embodiments.
Figure 10B:
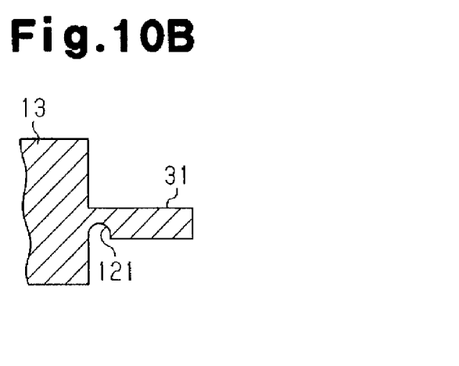
Figure 10C:
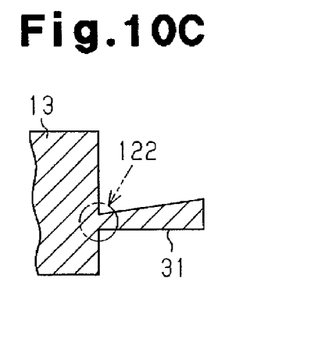
Figure 10D:
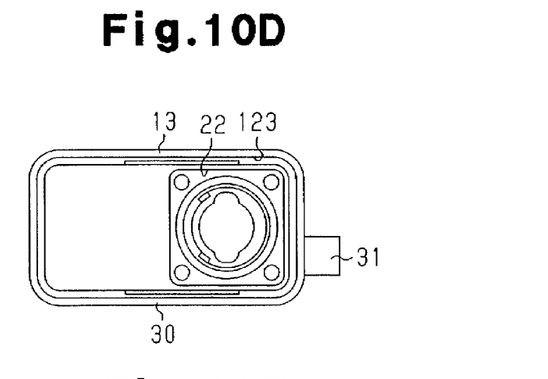
FIGS. 10D and 10E are lower views showing brittle portions in the second case parts of further embodiments.
Figure 10E:
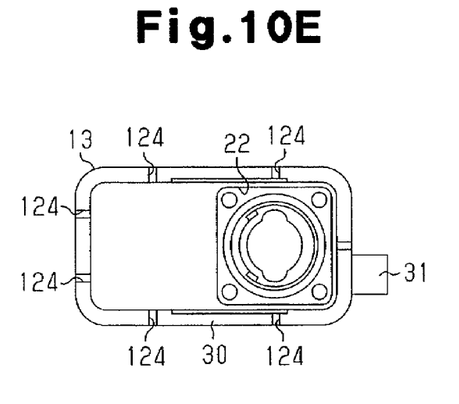
Figure 10F:
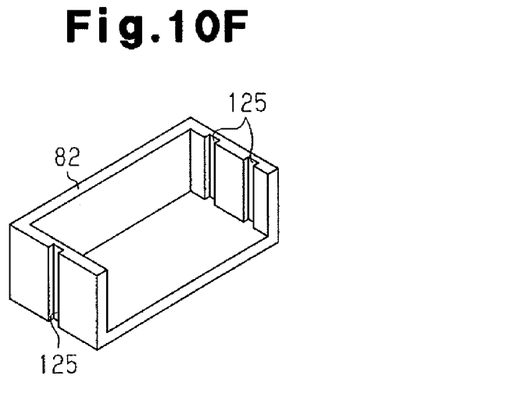
FIG. 10F is a schematic perspective view showing brittle portions in the second case part of another embodiment.

In the preferred embodiment, the groove 32 having a square cross-section and functioning as the brittle portion extends across the entire basal portion of the tongue 31. Alternatively, a groove 120 having a V-shaped cross-section may be used as shown in FIG. 10A. A groove 121 having a U-shaped cross-section may also be used as shown in FIG. 10B. Instead of the groove 32, the thickness of the tongue 31 may be gradually decreased toward its basal portion as shown in FIG. 10C. In this case, the thickness of the tongue 31 is minimal at the basal portion, which defines a thin portion 122. Further, as shown in FIG. 10D, a rectangular groove 123 may be formed as the brittle portion on the upper or lower surface of the flange 30 in the first case part 13 along the outer surface of the side wall defining the board compartment 21. As shown in FIG. 10E, grooves 124 extending perpendicular to the outer side surfaces of the side walls defining the board compartment 21 may be formed as brittle portions on the upper surface or lower surface of the flange 30 of the first case part 13 at predetermined intervals. As shown in FIG. 10F, one or more grooves 125 may be formed on the outer or inner surfaces of the side walls of the fixed cover piece 82 as the brittle portion.

The present examples and embodiments are to be considered as illustrative and not restrictive, and the invention is not to be limited to the details given herein, but may be modified within the scope and equivalence of the appended claims.

What is claimed is:

1. A portable device for performing wireless communication with a predetermined communication subject, the portable device comprising:
   a circuit board on which an electronic component used to perform wireless communication is mounted; and
   a case for accommodating the circuit board, the case including:
     a first case part having a board compartment for accommodating the circuit board;
     a second case part for covering the circuit board when accommodated in the board compartment of the first case part, wherein the first case part and the second case part are joined with each other and unitized in a superimposed state~
     the first case part is formed from a synthetic resin that transmits laser light;
     the second case part is formed from a synthetic resin that absorbs laser light;
     the first case part and the second case part each include a joined portion, wherein the joined portion of the first case part and the joined portion of the second case part are laser welded to each other in the superimposed state, with the joined portion of the first case part transmitting laser light therethrough and the joined portion of the second case part absorbing laser light;
     the first case part has a first side including the board compartment and a second side opposite the first side, and the second case part entirely covers the first side of the first case part, the case further including:
   a cover entirely covering the second side of the first case part, in which the second case part and the cover are each formed from a synthetic resin having light resistance to ultraviolet light.

2. The portable device according to claim 1, wherein:
   the first case part includes a battery compartment in the second side to accommodate a battery for supplying the electronic component on the circuit board with power; and the cover includes a movable cover piece detachably attached to the first case part at a location corresponding to the battery compartment and a fixed cover piece fixed to the first case part adjacent to the movable cover piece.

3. The portable device according to claim 2, wherein:

the movable cover piece is detachable from the first case part in a first direction and includes an engaged portion engageable with the first case part; and the first case part includes a tongue extending outward in the first direction, the tongue having an engaging portion engageable with the engaged portion of the movable cover piece.

4. The portable device according to claim 3, further comprising:

a key holder defined by the first case part, the second case part, and the cover and having an opening extending in the first direction; and a mechanical key retainable in the key holder.

5. The portable device according to claim 4, wherein:

the second case part includes a lock member holder defined at a location corresponding to the tongue of the first case part, and the lock member holder accommodates a first lock member that is engageable with the mechanical key; and the mechanical key includes a second lock member that is engageable with the first lock member when the mechanical key is retained in the key holder, the second lock member being movable between a lock position at which the second lock member is engaged with the first lock member and an unlock position at which the second lock is disengaged from the first lock member.

6. The portable device according to claim 4, wherein the first case part includes a brittle portion arranged in the vicinity of the joined portion that is joined with the second case part, the brittle portion having strength that is lower than other portions of the first case part so that the brittle portion breaks when disjoining the first case part and second case part.

7. The portable device according to claim 6, wherein the brittle portion is arranged at a portion that becomes exposed when the movable cover piece is removed from the first case part.

8. The portable device according to claim 6, wherein the brittle portion has a thickness that is less than that of the tongue.

9. The portable device according to claim 1, wherein the case includes a packing arranged between the second case part and the first side of the first case part, wherein the packing is held between the first and second case parts.

10. The portable device according to claim 9, wherein the second case part includes a receptacle extending toward the board compartment of the first case part, the portable device further comprising:

a switch arranged on the circuit board; and a push button received in the receptacle of the second case part to push the switch, wherein the packing is arranged between the push button and the switch, and the push button pushes the switch with the packing.

11. The portable device according to claim 10, wherein the packing covers the circuit board accommodated in the board compartment of the first case part and seals the board compartment.

* * * * *